United States Patent
Zhu

(10) Patent No.: US 11,469,858 B2
(45) Date of Patent: Oct. 11, 2022

(54) HYBRID AUTOMATIC REPEAT REQUEST FEEDBACK INDICATION AND FEEDBACK METHOD, DEVICE, AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 63 days.

(21) Appl. No.: 16/762,420

(22) PCT Filed: Nov. 17, 2017

(86) PCT No.: PCT/CN2017/111709
§ 371 (c)(1),
(2) Date: May 7, 2020

(87) PCT Pub. No.: WO2019/095304
PCT Pub. Date: May 23, 2019

(65) Prior Publication Data
US 2021/0075555 A1    Mar. 11, 2021

(51) Int. Cl.
*H04W 4/00*    (2018.01)
*H04L 1/18*    (2006.01)
(Continued)

(52) U.S. Cl.
CPC .............. *H04L 1/1819* (2013.01); *H04W 8/24* (2013.01); *H04W 72/042* (2013.01);
(Continued)

(58) Field of Classification Search
None
See application file for complete search history.

(56) References Cited

U.S. PATENT DOCUMENTS 9,001,756 B2    4/2015    Chen
9,603,141 B2    3/2017    Chen et al.
(Continued)

FOREIGN PATENT DOCUMENTS

CN    101378306 A    3/2009
CN    102684855 A    9/2012
(Continued)

OTHER PUBLICATIONS

International Search Report in the international application No. PCT/CN2017/111709, dated Aug. 6, 2018.
(Continued)

*Primary Examiner* — Clemence S Han
(74) *Attorney, Agent, or Firm* — Syncoda LLC; Feng Ma

(57) ABSTRACT

A method for HARQ feedback indication includes: determining to send current downlink data to a terminal; generating uplink HARQ feedback indication information for the current downlink data, wherein a timing relationship indicated by the uplink HARQ feedback indication information is obtained from a first set of timing relationships between a time domain unit of downlink data for the terminal and a time domain unit of an uplink HARQ feedback of the downlink data; and sending to the terminal the current downlink data and downlink control information (DCI) carrying the uplink HARQ feedback indication information. A dynamic HARQ feedback can be realized by a terminal.

17 Claims, 14 Drawing Sheets

(51) Int. Cl.
  *H04W 76/27* (2018.01)
  *H04W 8/24* (2009.01)
  *H04W 72/04* (2009.01)
  *H04W 80/02* (2009.01)

(52) U.S. Cl.
  CPC ....... *H04W 72/0446* (2013.01); *H04W 76/27* (2018.02); *H04W 80/02* (2013.01)

(56) References Cited

U.S. PATENT DOCUMENTS

| | | |
|---|---|---|
| 2012/0230273 A1 | 9/2012 | He |
| 2012/0275400 A1 | 11/2012 | Chen |
| 2015/0110022 A1 | 4/2015 | Liu et al. |
| 2015/0215916 A1 | 7/2015 | Chen et al. |
| 2017/0064680 A1 | 3/2017 | Chen et al. |
| 2017/0134140 A1* | 5/2017 | Park .................. H04W 72/042 |
| 2017/0373801 A1* | 12/2017 | Bergstrom ............ H04L 1/1896 |
| 2019/0150007 A1* | 5/2019 | Frenne ................ H04W 72/042 370/252 |
| 2019/0208408 A1* | 7/2019 | Frenne .................. H04L 1/1896 |
| 2019/0208540 A1* | 7/2019 | Kim ...................... H04W 16/14 |
| 2020/0053677 A1* | 2/2020 | Tiirola .................. H04L 5/0055 |
| 2020/0112852 A1 | 4/2020 | Frenne |

FOREIGN PATENT DOCUMENTS

| | | |
|---|---|---|
| CN | 103327614 A | 9/2013 |
| CN | 103516487 A | 1/2014 |
| CN | 104348597 A | 2/2015 |
| CN | 107027181 A | 8/2017 |
| WO | 2017184049 A1 | 10/2017 |

OTHER PUBLICATIONS

English translation of the Written Opinion of the International Search Authority in the international application No. PCT/CN2017/111709, dated Aug. 6, 2018.

Huawei et al: "HARQ timing, multiplexing, and bundling", 3GPP Draft: R1-1715408, 3rd Generation Partnership Project (3GPP), Mobile Competence Centre; 650, Route Des Lucioles: F-06921 Sophia-Antipolis Cedex France vol. RAN WG1, No. Nagoya, Japan; 20170918-2017092117, XP051338876, pp. 1-3.

Huawei Hisilicon: "Discussion on timing relations and signaling of HARQ timing for NR", 3GPP Draft R1-1611218, 3rd Generation Partnership Project (3GPP), Mobilecompetence Centre; 650, Route Des Lucioles: F-06921 Sophia-Antipolis Cedex France vol. RAN WG1, No. Reno, USA; 20161114-2016111813, XP051175199, p. 2.

Supplementary European Search Report in the European application No. 17931883.7, dated May 14, 2021.

Office Action of the Indian application No. 202047024841, dated Aug. 6, 2021.

Chunyi Wang etc. "HARQ Signalling Design for Dynamic TDD System" «2014 IEEE 80th Vehicular Technology Conference (VTC2014-Fall)» Dec. 30, 2014.

Zhi Wen "Research on Relay HARQ technology based on LTE-A System" Nov. 1, 2015.

Second Office Action of the Chinese application No. 201780001911.8, dated Jul. 6, 2021.

* cited by examiner

HYBRID AUTOMATIC REPEAT REQUEST FEEDBACK INDICATION AND FEEDBACK METHOD, DEVICE, AND BASE STATION

CROSS-REFERENCE TO RELATED APPLICATION

The present application is a national stage of International Application No. PCT/CN2017/111709 filed on Nov. 17, 2017, the disclosure of which is hereby incorporated by reference in its entirety.

TECHNICAL FIELD

The present disclosure generally relates to the technical field of communications, and more particularly, to Hybrid Automatic Repeat reQuest (HARQ) feedback indication and feedback methods and devices, a base station, User Equipment (UE) and a computer-readable storage medium.

BACKGROUND

With constant emergence of novel Internet applications of new-generation Augmented Reality (AR), Virtual Reality (VR), vehicle-to-vehicle communication and the like, higher requirements have been made to wireless communication technologies, which promote constant evolution of the wireless communication technologies to meet the requirements of the applications. At present, a cellular mobile communication technology is in an evolution stage of a new-generation technology. An important characteristic of the new-generation technology is that flexible configuration of multiple service types is supported. Different service types have different requirements on a wireless communication technology. For example, a main requirement of an enhanced Mobile Broad Band (eMBB) service type focuses on the aspects of high bandwidth, high rate and the like, a main requirement of an Ultra Reliable Low Latency Communication (URLLC) service type focuses on the aspects of relatively high reliability and low delay, and a main requirement of a massive Machine Type Communication (mMTC) service type focuses on the aspect of large connection number. Therefore, a new-generation wireless communication system requires a flexible and configurable design to support transmission of multiple service types.

In a wireless communication system, a time varying characteristic and multipath fading of a wireless channel may bring influence to signal transmission, resulting in a data transmission failure. For solving this problem, a HARQ mechanism is introduced into a conventional wireless communication system, and a sending side determines whether a data packet that has been sent is required to be resent according to a feedback of a receiving side about whether data is correctly received. In a conventional Long-Term Evolution (LTE) system, there is a timing relationship between time of transmission and Acknowledgement (ACK) or Negative Acknowledgement (NACK) feedback of data. Under a limit of a processing capability of UE in LTE, there are at least 4 milliseconds (ms) between time of transmission and ACK or NACK feedback of data. In an LTE system, HARQ feedback of a downlink data packet is synchronous. That is, there is a fixed timing relationship between transmission of the downlink data packet and uplink ACK or NACK feedback of the downlink data packet. HARQ feedback of an uplink data packet may be synchronous or asynchronous.

Along with enhancement of a capability of UE, the UE may have a higher processing capability. Under this circumstance, the UE may give an ACK or NACK feedback faster for received data to reduce a data transmission delay. This is important to some services with relatively high delay requirements such as a URLLC service. A conventional HARQ timing feedback manner is no more applicable to such a scenario.

SUMMARY

In view of this, the present disclosure discloses HARQ feedback indication and feedback methods and devices, a base station, UE and a computer-readable storage medium, to support dynamical HARQ feedback of UE.

According to a first aspect of embodiments of the present disclosure, there is provided a method for HARQ feedback indication for applying to a base station, which may include that:

present downlink data to be sent to UE is determined;

uplink HARQ feedback indication information is generated for the present downlink data, a timing relationship indicated by the uplink HARQ feedback indication information being included in a set of first timing relationships between time-domain units where downlink data for the UE are located and time-domain units for uplink HARQ feedback of the downlink data; and the present downlink data and Downlink Control Information (DCI) carrying the uplink HARQ feedback indication information are sent to the UE.

In an embodiment, the method may further include that:

capability information reported by the UE is received;

in response to determining, according to the capability information, that the UE supports dynamic HARQ feedback, the set of first timing relationships is generated; and the set of first timing relationships is sent to the UE.

In an embodiment, the method may further include that:

a set of second timing relationships between time-domain units where downlink data supported by a present system are located and the time-domain units for uplink HARQ feedback of the downlink data is predefined, or the set of second timing relationships is notified to the UE through signaling;

capability information reported by the UE is received;

in response to determining, according to the capability information, that the UE supports dynamic HARQ feedback, a generation rule for the set of first timing relationships is generated; and the generation rule is sent to the UE for generating, by the UE, the set of first timing relationships according to the generation rule and the set of second timing relationships.

In an embodiment, the uplink HARQ feedback indication information may be carried in an information field of the DCI, and a bit length of the information field may be a fixed value or may be determined based on the number of timing relationships included in the set of first timing relationships.

In an embodiment, the signaling may include Radio Resource Control (RRC) signaling, a Media Access Control (MAC) Control Element (CE) or physical-layer signaling.

In an embodiment, in response to the UE does not support dynamic HARQ feedback, the uplink HARQ feedback indication information may be a fixed value, the fixed value may be in the set of first timing relationships, and the fixed value may be preset by a present system or configured by the base station.

According to a second aspect of the embodiments of the present disclosure, there is provided a method for HARQ feedback for applying to UE, which may include that:

present downlink data and DCI carrying uplink HARQ feedback indication information for the present downlink data are received from a base station, a timing relationship indicated by the uplink HARQ feedback indication information being included in a set of first timing relationships between time-domain units where downlink data for the UE are located and time-domain units for uplink HARQ feedback of the downlink data;

the uplink HARQ feedback indication information is obtained by parsing the DCI;

a timing relationship between a time-domain unit where the present downlink data is located and a time-domain unit for uplink HARQ feedback of the present downlink data is acquired according to the uplink HARQ feedback indication information and a prestored set of first timing relationships; and uplink HARQ feedback information for the present downlink data is sent according to the acquired timing relationship.

In an embodiment, the method may further include that:

capability information of the UE is reported to the base station; and the set of first timing relationships which is sent by the base station according to the capability information is received and stored.

In an embodiment, the method may further include that:

a set of second timing relationships, which is predefined, or is received from the base station via signaling, between time-domain units where downlink data supported by a present system are located and time-domain units for uplink HARQ feedback of the downlink data is obtained;

capability information of the UE is reported to the base station;

a generation rule, which is sent by the base station according to the capability information, for the set of first timing relationships is received;

the set of first timing relationships is generated according to the generation rule and the set of second timing relationships; and the set of first timing relationships is stored.

In an embodiment, the uplink HARQ feedback indication information may be carried in an information field of the DCI, and a bit length of the information field may be a fixed value or may be determined based on the number of timing relationships included in the set of first timing relationships.

In an embodiment, the signaling may include RRC signaling, a MAC CE or physical-layer signaling.

In an embodiment, in response to the UE does not support dynamic HARQ feedback, the uplink HARQ feedback indication information may be a fixed value, the fixed value may be in the set of first timing relationships, and the fixed value may be preset by a present system or configured by the base station.

According to a third aspect of the embodiments of the present disclosure, there is provided a device for HARQ feedback indication for applying to a base station, which may include:

a determination module, configured to determine present downlink data to be sent to UE;

a first generation module, configured to generate uplink HARQ feedback indication information for the present downlink data determined by the determination module, a timing relationship indicated by the uplink HARQ feedback indication information being included in a set of first timing relationships between time-domain units where downlink data for the UE are located and time-domain units for uplink HARQ feedback of the downlink data; and a first sending module, configured to send the present downlink data and DCI carrying the uplink HARQ feedback indication information generated by the first generation module to the UE.

In an embodiment, the device may further include:

a first receiving module, configured to receive capability information reported by the UE;

a first determination generation module, configured to, in response to determining, according to the capability information received by the first receiving module, that the UE supports dynamic HARQ feedback, generate the set of first timing relationships; and a second sending module, configured to send the set of first timing relationships generated by the first determination generation module to the UE.

In an embodiment, the device may further include:

a definition and notification module, configured to predefine a set of second timing relationships between time-domain units where downlink data supported by a present system are located and time-domain units for uplink HARQ feedback of the downlink data, or notify the set of second timing relationships to the UE through signaling;

a second receiving module, configured to receive the capability information reported by the UE;

a second determination generation module, configured to, in response to determining, according to the capability information received by the second receiving module, that the UE supports dynamic HARQ feedback, generate a generation rule for the set of first timing relationships; and a third sending module, configured to send the generation rule generated by the second determination generation module to the UE for generating the set of first timing relationships according to the generation rule and the set of second timing relationships defined or notified by the definition and notification module.

In an embodiment, the uplink HARQ feedback indication information may be carried in an information field of the DCI, and a bit length of the information field may be a fixed value or may be determined based on the number of timing relationships included in the set of first timing relationships.

In an embodiment, the signaling may include RRC signaling, a MAC CE or physical-layer signaling.

In an embodiment, in response to the UE does not support dynamic HARQ feedback, the uplink HARQ feedback indication information may be a fixed value, the fixed value may be in the set of first timing relationships, and the fixed value may be preset by a present system or configured by the base station.

According to a fourth aspect of the embodiments of the present disclosure, there is provided a device for HARQ feedback for applying to UE, which may include:

an information receiving module, configured to receive present downlink data and DCI carrying uplink HARQ feedback indication information for the present downlink data from a base station, a timing relationship indicated by the uplink HARQ feedback indication information being included in a set of first timing relationships between time-domain units where downlink data for the UE are located and time-domain units for uplink HARQ feedback of the downlink data;

a parsing module, configured to obtain the uplink HARQ feedback indication information by parsing the DCI received by the information receiving module;

an acquisition module, configured to acquire a timing relationship between a time-domain unit where the present downlink data is located and a time-domain unit for uplink HARQ feedback of the present downlink data according to the uplink HARQ feedback indication information obtained by the parsing module and a prestored set of first timing relationships; and a sending module, configured to send uplink HARQ feedback information for the present downlink data according to the timing relationship acquired by the acquisition module.

In an embodiment, the device may further include:

a first reporting module, configured to report capability information of the UE to the base station; and a receiving and storing module, configured to receive and store the set of first timing relationships which is sent by the base station according to the capability information reported by the first reporting module.

In an embodiment, the device may further include:

an obtaining module, configured to obtain a set of second timing relationships, which is predefined, or is received from the base station via signaling, between time-domain units where downlink data supported by a present system are located and time-domain units for uplink HARQ feedback of the downlink data;

a second reporting module, configured to report the capability information of the UE to the base station; and a generation rule receiving module, configured to receive a generation rule, which is sent by the base station according to the capability information reported by the second reporting module, for the set of first timing relationships;

a second generation module, configured to generate the set of first timing relationships according to the generation rule received by the generation rule receiving module and the set of second timing relationships obtained by the obtaining module; and a storing module, configured to store the set of first timing relationships generated by the second generation module.

In an embodiment, the uplink HARQ feedback indication information may be carried in an information field of the DCI, and a bit length of the information field may be a fixed value or may be determined based on the number of timing relationships included in the set of first timing relationships.

In an embodiment, the signaling may include RRC signaling, a MAC CE or physical-layer signaling.

In an embodiment, in response to the UE does not support dynamic HARQ feedback, the uplink HARQ feedback indication information may be a fixed value, the fixed value may be in the set of first timing relationships, and the fixed value may be preset by the present system or configured by the base station.

According to a fifth aspect of the embodiments of the present disclosure, there is provided a base station, which may include:

a processor; and a memory configured to store processor-executable instructions, wherein the processor may be configured to:

determine present downlink data to be sent to UE;

generate uplink HARQ feedback indication information for the present downlink data, a timing relationship indicated by the uplink HARQ feedback indication information being included in a set of first timing relationships between time-domain units where downlink data for the UE are located and time-domain units for uplink HARQ feedback of the downlink data; and send the present downlink data and DCI carrying the uplink HARQ feedback indication information to the UE.

According to a sixth aspect of the embodiments of the present disclosure, there is provided UE, which may include:

a processor; and a memory configured to store processor-executable instructions, wherein the processor may be configured to:

receive present downlink data and DCI carrying uplink HARQ feedback indication information for the present downlink data from a base station, a timing relationship indicated by the uplink HARQ feedback indication information being included in a set of first timing relationships between time-domain units where downlink data for the UE are located and time-domain units for uplink HARQ feedback of the downlink data;

obtain the uplink HARQ feedback indication information by parsing the DCI;

acquire a timing relationship between a time-domain unit where the present downlink data is located and a time-domain unit for uplink HARQ feedback of the present downlink data according to the uplink HARQ feedback indication information and a prestored set of first timing relationships; and send uplink HARQ feedback information for the present downlink data according to the acquired timing relationship.

According to a seventh aspect of the embodiments of the present disclosure, there is provided a computer-readable storage medium having stored therein computer instructions that when executed by a processor, implement the steps of a method for HARQ feedback indication.

According to an eighth aspect of the embodiments of the present disclosure, there is provided a computer-readable storage medium having stored therein computer instructions that when executed by a processor, implement the steps of a method for HARQ feedback.

The technical solutions provided in the embodiments of the present disclosure may have the following beneficial effects.

The uplink HARQ feedback indication information is generated for the present downlink data and the present downlink data and the DCI carrying the uplink HARQ feedback indication information are sent to the UE, to enable the UE to acquire the timing relationship between the time-domain unit where the present downlink data is located and the time-domain unit for uplink HARQ feedback of the present downlink data according to the uplink HARQ feedback indication information and the prestored set of first timing relationships, and send the uplink HARQ feedback information for the present downlink data according to the acquired timing relationship, so that the UE may implement dynamic HARQ feedback.

The uplink HARQ feedback indication information is obtained by parsing the received DCI, the timing relationship between the time-domain unit where the present downlink data is located and the time-domain unit for uplink HARQ feedback of the present downlink data is acquired according to the uplink HARQ feedback indication information and the prestored set of first timing relationships, and the uplink HARQ feedback information for the present downlink data is sent according to the acquired timing relationship, so that dynamic HARQ feedback is implemented.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
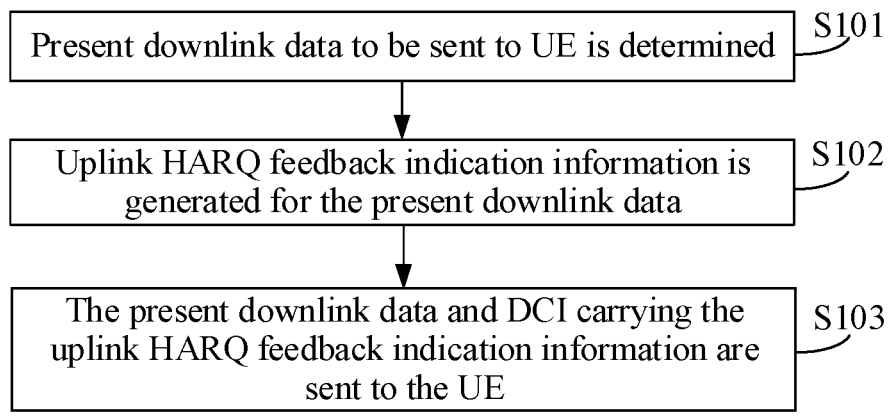
FIG. 1 is a flowchart illustrating a method for HARQ feedback indication, according to an exemplary embodiment of the present disclosure.

FIG. 1 is a flowchart illustrating a method for HARQ feedback indication, according to an exemplary embodiment of the present disclosure. The embodiment is described from a base station side. As illustrated in FIG. 1, the HARQ feedback indication method includes the following steps.

In S101, present downlink data is determined to be sent to UE.

In S102, uplink HARQ feedback indication information for the present downlink data is generated, a timing relationship indicated by the uplink HARQ feedback indication information being included in a set of first timing relationships between time-domain units where downlink data for the UE are located and time-domain units for uplink HARQ feedback of the downlink data.

A base station may generate the uplink HARQ feedback indication information for the present downlink data, the uplink HARQ feedback indication information may be carried in an information field of DCI, and a bit length of the information field may be a fixed value and may also be determined based on the number of timing relationships included in the set of first timing relationships. For example, if the set of first timing relationships includes four timing relationships, the length of the information field is 2 bit.

In the embodiment, in response to the UE supports dynamic HARQ feedback, for different downlink data, the uplink HARQ feedback indication information may be different numerical values. In response to the UE does not support HARQ feedback, the uplink HARQ feedback indication information is a fixed value, the fixed value is a plurality of fixed values in the set of first timing relationships, and may be preset by a present system or configured by the base station.

In S103, the present downlink data and DCI carrying the uplink HARQ feedback indication information are sent to the UE.

The base station, after generating the uplink HARQ feedback indication information for the present downlink data, may send the present downlink data and the DCI carrying the uplink HARQ feedback indication information to the UE; and the UE, after receiving the DCI, may acquire the timing relationship between the time-domain unit where the present downlink data is located and the time-domain unit for uplink HARQ feedback of the present downlink data according to the uplink HARQ feedback indication information obtained by parsing and the prestored set of first timing relationships, and send uplink HARQ feedback information for the present downlink data.

According to the embodiment, the uplink HARQ feedback indication information is generated for the present downlink data and the present downlink data and the DCI carrying the uplink HARQ feedback indication information are sent to the UE, to enable the UE to acquire the timing relationship between the time-domain unit where the present downlink data is located and the time-domain unit for uplink HARQ feedback of the present downlink data according to the uplink HARQ feedback indication information and the prestored set of first timing relationships, and send the uplink HARQ feedback information of the present downlink data according to the acquired timing relationship, so that the UE may implement dynamic HARQ feedback.

Figure 2:
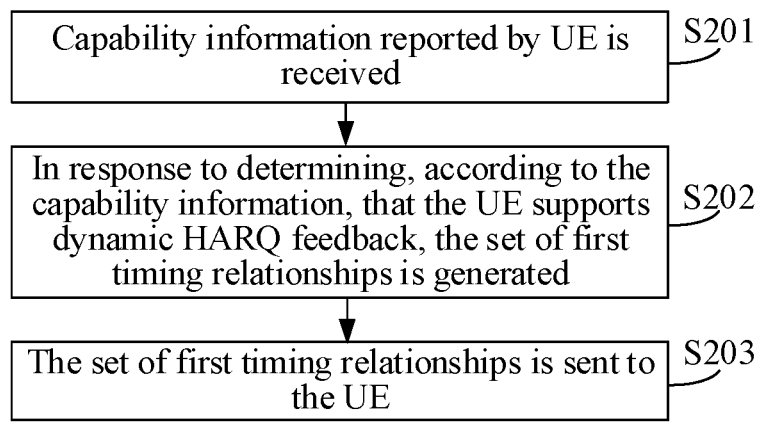
FIG. 2 is a flowchart illustrating another method for HARQ feedback indication, according to an exemplary embodiment of the present disclosure.

FIG. 2 is a flowchart illustrating another method for HARQ feedback indication, according to an exemplary embodiment of the present disclosure. As illustrated in FIG. 2, based on the embodiment illustrated in FIG. 1, the method for HARQ feedback indication may further include the following steps.

In S201, capability information reported by the UE is received.

In S202, in response to determining, according to the capability information, that the UE supports dynamic HARQ feedback, the set of first timing relationships is generated.

S201 and S202 are executed before S102.

In S203, the set of first timing relationships is sent to the UE.

According to the embodiment, in response to determining that the UE supports dynamic HARQ feedback, the set of first timing relationships is generated, and the set of first timing relationships is sent to the UE, so that a condition is provided for generation of the uplink HARQ feedback indication information and sending of the uplink HARQ feedback information.

Figure 3:
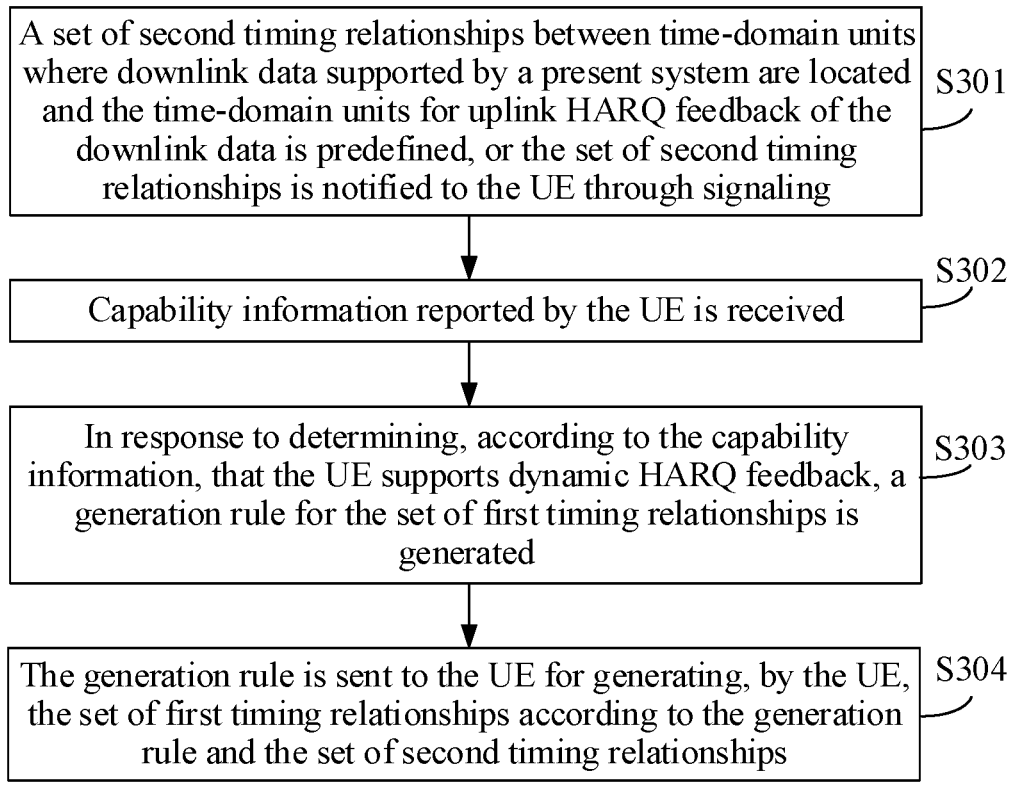
FIG. 3 is a flowchart illustrating another method for HARQ feedback indication, according to an exemplary embodiment of the present disclosure.

FIG. 3 is a flowchart illustrating another method for HARQ feedback indication, according to an exemplary embodiment of the present disclosure. As illustrated in FIG. 3, based on the embodiment illustrated in FIG. 1, the method for HARQ feedback indication may further include the following steps.

In S301, a set of second timing relationships between time-domain units where downlink data supported by a present system are located and time-domain units for uplink HARQ feedback of the downlink data is predefined, or the set of second timing relationships is notified to the UE through signaling.

The signaling includes RRC signaling, a MAC CE or physical-layer signaling.

In S302, the capability information reported by the UE is received.

In S303, in response to determining, according to the capability information, that the UE supports dynamic HARQ feedback, a generation rule for the set of first timing relationships is generated.

S301 to S303 are executed before S102.

In S304, the generation rule is sent to the UE for generating, by the UE, the set of first timing relationships according to the generation rule and the set of second timing relationships.

The set of first timing relationships is a subset of the set of second timing relationships.

According to the embodiment, in response to determining that the UE supports dynamic HARQ feedback, the generation rule for the set of first timing relationships is generated and the generation rule for the set of first timing relationships is sent to the UE, to enable the UE to generate the set of first timing relationships according to the generation rule and the set of second timing relationships, so that a condition is provided for generation of the uplink HARQ feedback indication information and the uplink HARQ feedback information.

Figure 4:
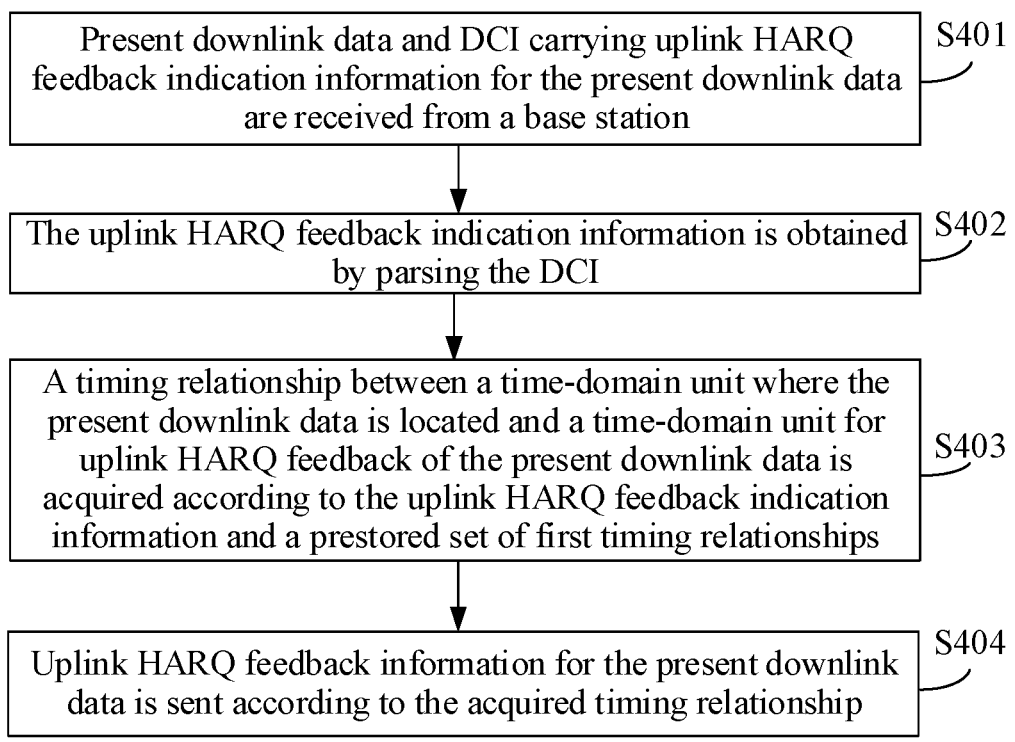
FIG. 4 is a flowchart illustrating a method for HARQ feedback, according to an exemplary embodiment of the present disclosure.

FIG. 4 is a flowchart illustrating a method for HARQ feedback, according to an exemplary embodiment of the present disclosure. The embodiment is described from UE side. As illustrated in FIG. 4, the method for HARQ feedback includes the following steps.

In S401, present downlink data and DCI carrying uplink HARQ feedback indication information for the present downlink data are received from a base station, a timing relationship indicated by the uplink HARQ feedback indication information being included in a set of first timing relationships between time-domain units where downlink data for UE are located and time-domain units for uplink HARQ feedback of the downlink data.

The uplink HARQ feedback indication information may be carried in an information field of the DCI, and a bit length of the information field may be a fixed value and may also be determined based on the number of timing relationships included in the set of first timing relationships. For example, if the set of first timing relationships includes four timing relationships, the length of the information field is 2 bit.

In S402, the uplink HARQ feedback indication information is obtained by parsing the DCI.

In S403, a timing relationship between a time-domain unit where the present downlink data is located and a time-domain unit for uplink HARQ feedback of the present downlink data is acquired according to the uplink HARQ feedback indication information and the prestored set of first timing relationships.

There is made such a hypothesis that the set of first timing relationships is illustrated in Table 11.

TABLE 11

| Set of First Timing Relationships | |
| --- | --- |
| Entry | Timing relationship |
| 00 | 1 symbol |
| 01 | 2 symbols |
| 10 | 4 symbols |
| 11 | 10 symbols |

If the uplink HARQ feedback indication information is 01, it may be acquired according to the uplink HARQ feedback indication information and the set of first timing relationships illustrated in Table 1 that the timing relationship between the time-domain unit where the present downlink data is located and the time-domain unit for uplink HARQ feedback of the present downlink data is two symbols.

In addition, it is to be noted that Table 11 is only an example of the set of first timing relationships and, during a practical application, another format, for example, a format illustrated in Table 12, may also be adopted for the set of first timing relationships.

TABLE 12

| Set of First Timing Relationships | |
| --- | --- |
| Entry | Timing relationship |
| 1 | 1 symbol |
| 2 | 2 symbols |
| 3 | 4 symbols |
| 4 | 10 symbols |

Since contents of the entries in Table 12 does not correspond to a content indicated by the information field, a corresponding relationship between the contents of the entries and the contents indicated by the information field may be predefined, or the base station may also notify the corresponding relationship between the contents of the entries and the contents indicated by the information field to the UE through signaling. For example, the corresponding relationship may be that contents 00, 01, 10 and 11 indicated by the information field correspond to the entries 1, 2, 3 and 4 in Table 12 respectively.

In S404, uplink HARQ feedback information for the present downlink data is sent according to the acquired timing relationship.

If the timing relationship is two symbols and the UE transmits the present downlink data on symbol 3, the UE sends the uplink HARQ feedback information for the present downlink data on symbol 5.

According to the embodiment, the uplink HARQ feedback indication information is obtained by parsing the received DCI, the timing relationship between the time-domain unit where the present downlink data is located and the time-domain unit for uplink HARQ feedback of the present downlink data is acquired according to the uplink HARQ feedback indication information and the prestored set of first timing relationships, and the uplink HARQ feedback information for the present downlink data is sent according to the acquired timing relationship, so that dynamic HARQ feedback is implemented.

Figure 5:
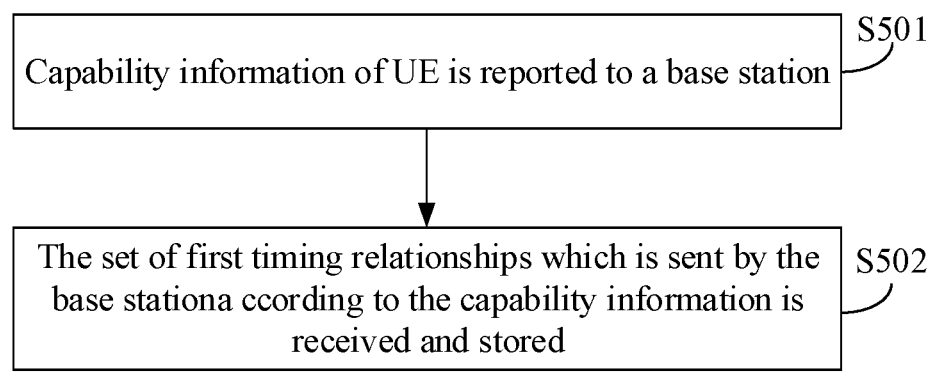
FIG. 5 is a flowchart illustrating another method for HARQ feedback, according to an exemplary embodiment of the present disclosure.

FIG. 5 is a flowchart illustrating another method for HARQ feedback, according to an exemplary embodiment of the present disclosure. As illustrated in FIG. 5, the HARQ feedback method may further include the following steps.

In S501, capability information of the UE is reported to the base station.

In S502, the first timing relationship set sent by the base station according to the capability information is received and stored.

According to the embodiment, the capability information of the UE is reported to the base station, and the base station, in response to determining according to the capability information that the UE supports dynamic HARQ feedback, generates the set of first timing relationships and sends the set of first timing relationships to the UE, so that a condition is provided for the UE to acquire the timing relationship between the time-domain unit where the present downlink data is located and the time-domain unit for uplink HARQ feedback of the present downlink data, and a condition is further provided for sending of the uplink HARQ feedback information.

Figure 6:
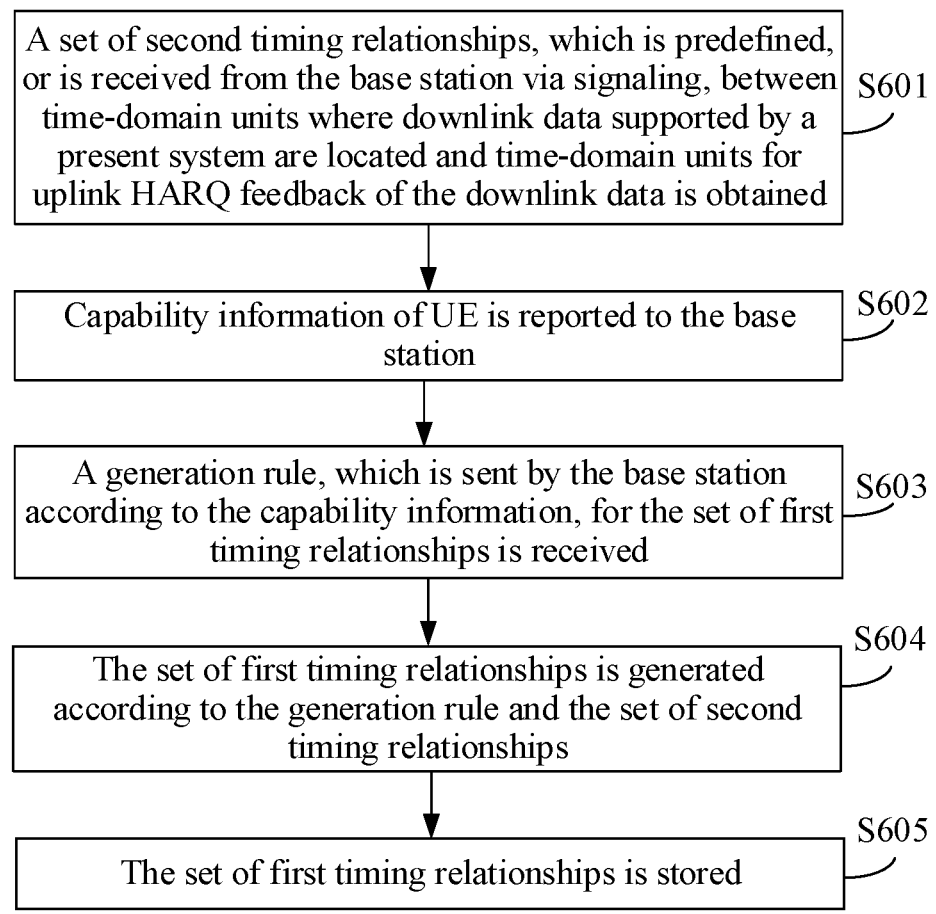
FIG. 6 is a flowchart illustrating another method for HARQ feedback, according to an exemplary embodiment of the present disclosure.

FIG. 6 is a flowchart illustrating another method for HARQ feedback, according to an exemplary embodiment of the present disclosure. As illustrated in FIG. 6, the method for HARQ feedback may further include the following steps.

In S601, a set of second timing relationships, which is predefined, or is received from the base station via signaling, between time-domain units where downlink data supported by a present system are located and time-domain units for uplink HARQ feedback of the downlink data is obtained.

The signaling includes RRC signaling, a MAC CE or physical-layer signaling.

In S602, the capability information of the UE is reported to the base station.

In S603, a generation rule, which is sent by the base station according to the capability information, for the set of first timing relationships is received.

In S604, the set of first timing relationships is generated according to the generation rule and the set of second timing relationships.

In S605, the set of first timing relationships is stored.

The set of first timing relationships is a subset of the set of second timing relationships.

According to the embodiment, the set of second timing relationships is obtained, the generation rule, which is sent by the base station according to the capability information reported by the UE, for the set of first timing relationships is received, and the set of first timing relationships is generated according to the generation rule and the set of second timing relationships, so that a condition is provided for the UE to acquire the timing relationship between the time-domain unit where the present downlink data is located and the time-domain unit for uplink HARQ feedback of the present downlink data, and a condition is further provided for sending of the uplink HARQ feedback information.

Figure 7:
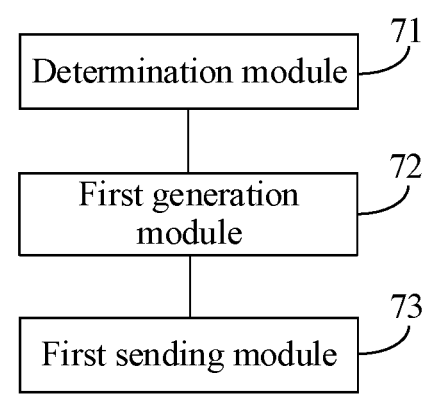
FIG. 7 is a block diagram of a device for HARQ feedback indication, according to an exemplary embodiment.

FIG. 7 is a block diagram of a device for HARQ feedback indication, according to an exemplary embodiment. The device may be positioned in a base station. As illustrated in FIG. 7, the device includes a determination module 71, a first generation module 72 and a first sending module 73.

The determination module 71 is configured to determine present downlink data to be sent to UE.

The first generation module 72 is configured to generate uplink HARQ feedback indication information for the present downlink data determined by the determination module 71, a timing relationship indicated by the uplink HARQ feedback indication information being included in a set of first timing relationships between time-domain units where downlink data for the UE are located and time-domain units for uplink HARQ feedback of the downlink data.

The base station may generate the uplink HARQ feedback indication information for the present downlink data, the uplink HARQ feedback indication information may be carried in an information field of DCI, and a bit length of the information field may be a fixed value and may also be determined based on the number of timing relationships included in the set of first timing relationships. For example, if the set of first timing relationships includes four timing relationships, the length of the information field is 2 bit.

In the embodiment, in response to the UE supports dynamic HARQ feedback, for different downlink data, the uplink HARQ feedback indication information may be different numerical values. In response to the UE does not support HARQ feedback, the uplink HARQ feedback indication information is a fixed value, the fixed value is a plurality of fixed values in the set of first timing relationships, and may be preset by a present system or configured by the base station.

The first sending module 73 is configured to send the present downlink data and DCI carrying the uplink HARQ feedback indication information generated by the first generation module 72 to the UE.

The base station, after generating the uplink HARQ feedback indication information for the present downlink data, may send the present downlink data and the DCI carrying the uplink HARQ feedback indication information to the UE; and the UE, after receiving the DCI, may acquire the timing relationship between the time-domain unit where the present downlink data is located and the time-domain unit for uplink HARQ feedback of the present downlink data according to the uplink HARQ feedback indication information obtained by parsing and the prestored set of first timing relationships, and send uplink HARQ feedback information for the present downlink data.

According to the embodiment, the uplink HARQ feedback indication information is generated for the present downlink data, and the present downlink data and the DCI carrying the uplink HARQ feedback indication information are sent to the UE, to enable the UE to acquire the timing relationship between the time-domain unit where the present downlink data is located and the time-domain unit for uplink HARQ feedback of the present downlink data according to the uplink HARQ feedback indication information and the prestored set of first timing relationships, and send the uplink HARQ feedback information of the present downlink data according to the acquired timing relationship, so that the UE may implement dynamic HARQ feedback.

Figure 8A:
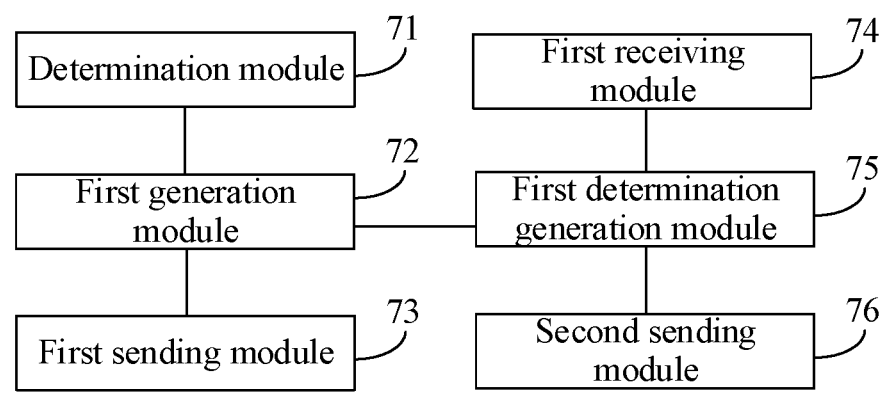
FIG. 8A is a block diagram of another device for HARQ feedback indication, according to an exemplary embodiment.

FIG. 8A is a block diagram of another device for HARQ feedback indication, according to an exemplary embodiment. As illustrated in FIG. 8A, based on the embodiment illustrated in FIG. 7, the device may further include a first receiving module 74, a first determination generation module 75 and a second sending module 76.

The first receiving module 74 is configured to receive capability information reported by the UE.

The first determination generation module 75 is configured to, in response to determining, according to the capability information received by the first receiving module 74, that the UE supports dynamic HARQ feedback, generate the set of first timing relationships.

The second sending module 76 is configured to send the set of first timing relationships generated by the first determination generation module 75 to the UE.

According to the embodiment, in response to determining that the UE supports dynamic HARQ feedback, the set of first timing relationships is generated, and the set of first timing relationships is sent to the UE, so that a condition is provided for generation of the uplink HARQ feedback indication information and sending of the uplink HARQ feedback information.

Figure 8B:
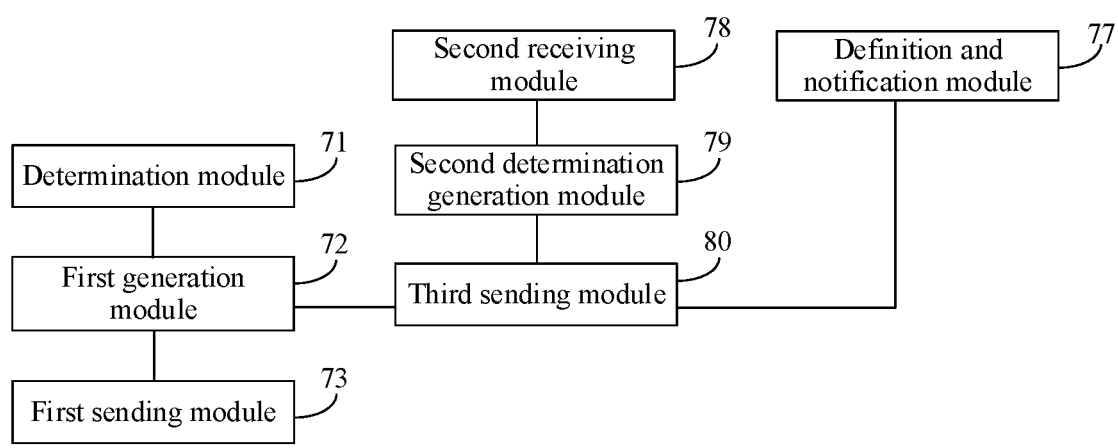
FIG. 8B is a block diagram of another device for HARQ feedback indication, according to an exemplary embodiment.

FIG. 8B is a block diagram of another device for HARQ feedback indication, according to an exemplary embodiment. As illustrated in FIG. 8B, based on the embodiment illustrated in FIG. 7, the device further includes a definition and notification module 77, a second receiving module 78, a second determination generation module 79 and a third sending module 80.

The definition and notification module 77 is configured to predefine a set of second timing relationships between time-domain units where downlink data supported by a present system are located and time-domain units for uplink HARQ feedback of the downlink data, or notify the set of second timing relationships to the UE through signaling.

The signaling includes RRC signaling, a MAC CE or physical-layer signaling.

The second receiving module 78 is configured to receive the capability information reported by the UE.

The second determination generation module 79 is configured to, in response to determining, according to the capability information received by the second receiving module 78, that the UE supports dynamic HARQ feedback, generate a generation rule for the set of first timing relationships.

The third sending module 80 is configured to send the generation rule generated by the second determination generation module 79 to the UE for generating, by the UE, the set of first timing relationships according to the generation rule and the set of second timing relationships defined or notified by the definition and notification module 77.

The set of first timing relationships is a subset of the set of second timing relationships.

According to the embodiment, in response to determining that the UE supports dynamic HARQ feedback, the generation rule for the set of first timing relationships is generated and the generation rule for the set of first timing relationships is sent to the UE, to enable the UE to generate the set of first timing relationships according to the generation rule and the set of second timing relationships, so that a condition is provided for generation of the uplink HARQ feedback indication information and the uplink HARQ feedback information.

Figure 9:
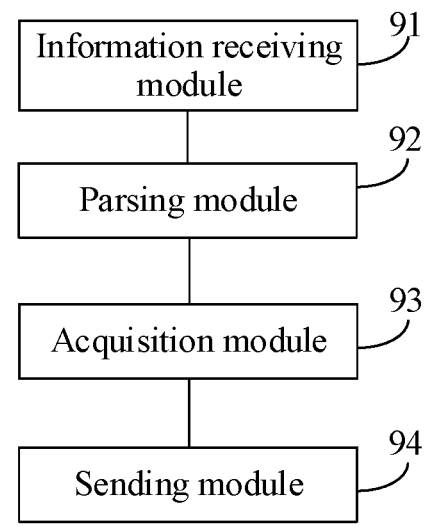
FIG. 9 is a block diagram of a device for HARQ feedback, according to an exemplary embodiment.

FIG. 9 is a block diagram of a device for HARQ feedback, according to an exemplary embodiment. The device may be positioned in UE. As illustrated in FIG. 9, the device includes an information receiving module 91, a parsing module 92, an acquisition module 93 and a sending module 94.

The information receiving module 91 is configured to receive present downlink data and DCI carrying uplink HARQ feedback indication information for the present downlink data from a base station, a timing relationship indicated by the uplink HARQ feedback indication information being included in a set of first timing relationships between time-domain units where downlink data for the UE are located and time-domain units for uplink HARQ feedback of the downlink data.

The uplink HARQ feedback indication information may be carried in an information field of the DCI, and a bit length of the information field may be a fixed value and may also be determined based on the number of timing relationships included in the set of first timing relationships. For example, if the set of first timing relationships includes four timing relationships, the length of the information field is 2 bit.

The parsing module 92 is configured to obtain the uplink HARQ feedback indication information by parsing the DCI received by the information receiving module 91.

The acquisition module 93 is configured to acquire a timing relationship between a time-domain unit where the present downlink data is located and a time-domain unit for uplink HARQ feedback of the present downlink data according to the uplink HARQ feedback indication information obtained by the parsing module 92 and the prestored set of first timing relationships.

If the uplink HARQ feedback indication information is 01, it may be acquired according to the uplink HARQ feedback indication information and the set of first timing relationships illustrated in Table 1 that the timing relationship between the time-domain unit where the present downlink data is located and the time-domain unit for uplink HARQ feedback of the present downlink data is two symbols.

In addition, it is to be noted that Table 11 is only an example of the set of first timing relationships and, during a practical application, another format, for example, a format illustrated in Table 12, may also be adopted for the set of first timing relationships.

Since contents of the entries in Table 12 do not correspond to contents indicated by the information field, a corresponding relationship between the contents of the entries and the contents indicated by the information field may be predefined, or the base station may also notify the corresponding relationship between the contents of the entries and the contents indicated by the information field to the UE through signaling. For example, the corresponding relationship may be that contents 00, 01, 10 and 11 indicated by the information field correspond to the entries 1, 2, 3 and 4 in Table 12 respectively.

The sending module 94 is configured to send uplink HARQ feedback information for the present downlink data according to the timing relationship acquired by the acquisition module 93.

If the timing relationship is two symbols and the UE transmits the present downlink data on symbol 3, the UE sends the uplink HARQ feedback information for the present downlink data on symbol 5.

According to the embodiment, the uplink HARQ feedback indication information is obtained by parsing the received DCI, the timing relationship between the time-domain unit where the present downlink data is located and the time-domain unit for uplink HARQ feedback of the present downlink data is acquired according to the uplink HARQ feedback indication information and the prestored set of first timing relationships, and the uplink HARQ feedback information for the present downlink data is sent according to the acquired timing relationship, so that dynamic HARQ feedback is implemented.

Figure 10A:
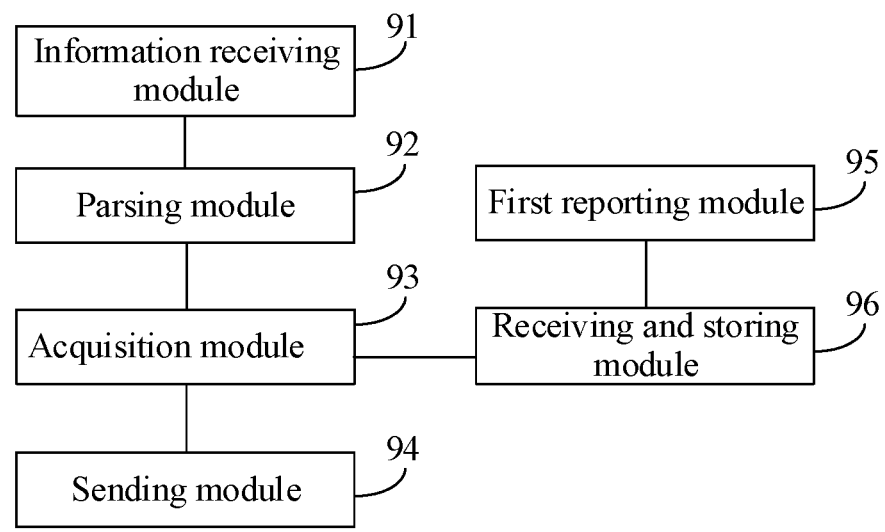
FIG. 10A is a block diagram of another device for HARQ feedback, according to an exemplary embodiment.

FIG. 10A is a block diagram of another device for HARQ feedback, according to an exemplary embodiment. As illustrated in FIG. 10A, based on the embodiment illustrated in FIG. 9, the device may further include a first reporting module 95 and a receiving and storing module 96.

The first reporting module 95 is configured to report capability information of the UE to the base station.

The receiving and storing module 96 is configured to receive and store the set of first timing relationships sent by the base station according to the capability information reported by the first reporting module 95.

According to the embodiment, the capability information of the UE is reported to the base station, and the base station, in response to determining according to the capability information that the UE supports dynamic HARQ feedback, generates the set of first timing relationships and sends the set of first timing relationships to the UE, so that a condition is provided for the UE to acquire the timing relationship between the time-domain unit where the present downlink data is located and the time-domain unit for uplink HARQ feedback of the present downlink data, and a condition is further provided for sending of the uplink HARQ feedback information.

Figure 10B:
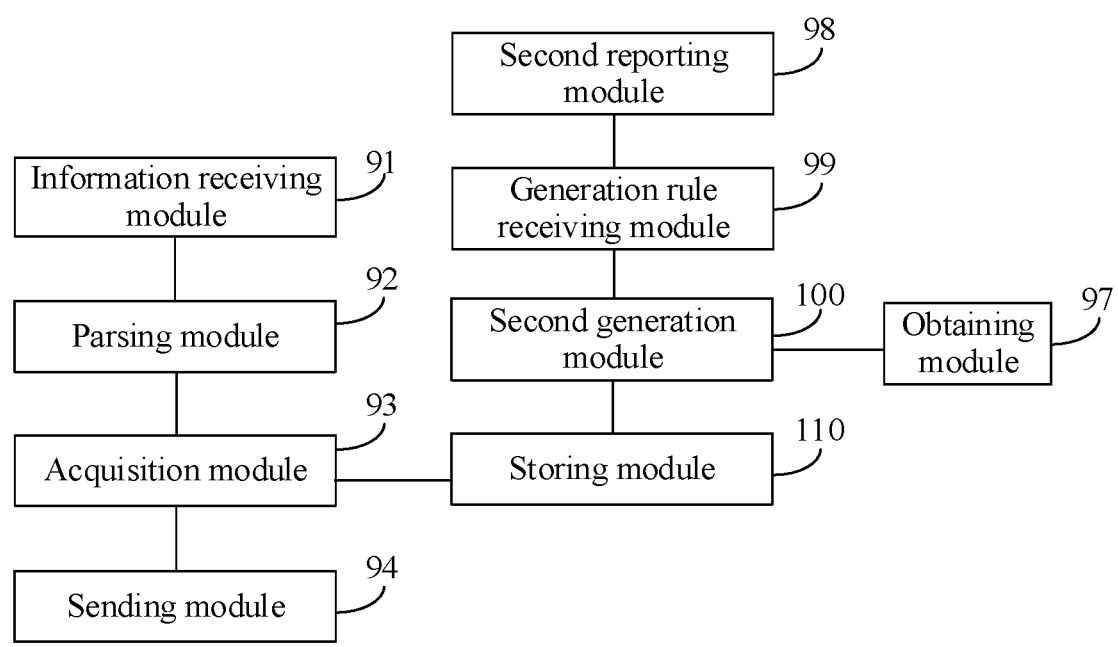
FIG. 10B is a block diagram of another device for HARQ feedback, according to an exemplary embodiment.

FIG. 10B is a block diagram of another device for HARQ feedback, according to an exemplary embodiment. As illustrated in FIG. 10B, based on the embodiment illustrated in FIG. 9, the device may further include an obtaining module 97, a second reporting module 98, a generation rule receiving module 99, a second generation module 100 and a storing module 110.

The obtaining module 97 is configured to obtain a set of second timing relationships, which is predefined, or is received from the base station via signaling, between time-domain units where downlink data supported by a present system are located and time-domain units for uplink HARQ feedback of the downlink data.

The signaling includes RRC signaling, a MAC CE or physical-layer signaling.

The second reporting module 98 is configured to report the capability information of the UE to the base station.

The generation rule receiving module 99 is configured to receive a generation rule, which is sent by the base station according to the capability information reported by the second reporting module 98, for the set of first timing relationships.

The second generation module 100 is configured to generate the set of first timing relationships according to the generation rule received by the generation rule receiving module 99 and the set of second timing relationships obtained by the obtaining module 97.

The storing module 110 is configured to store the set of first timing relationships generated by the second generation module 100.

The set of first timing relationships is a subset of the set of second timing relationships.

According to the embodiment, the set of second timing relationships is obtained, the generation rule, which is sent by the base station according to the capability information reported by the UE, for the set of first timing relationships is received, and the set of first timing relationships is generated according to the generation rule and the set of second timing relationships, so that a condition is provided for the UE to acquire the timing relationship between the time-domain unit where the present downlink data is located and the time-domain unit for uplink HARQ feedback of the present downlink data, and a condition is further provided for sending of the uplink HARQ feedback information.

Figure 11:
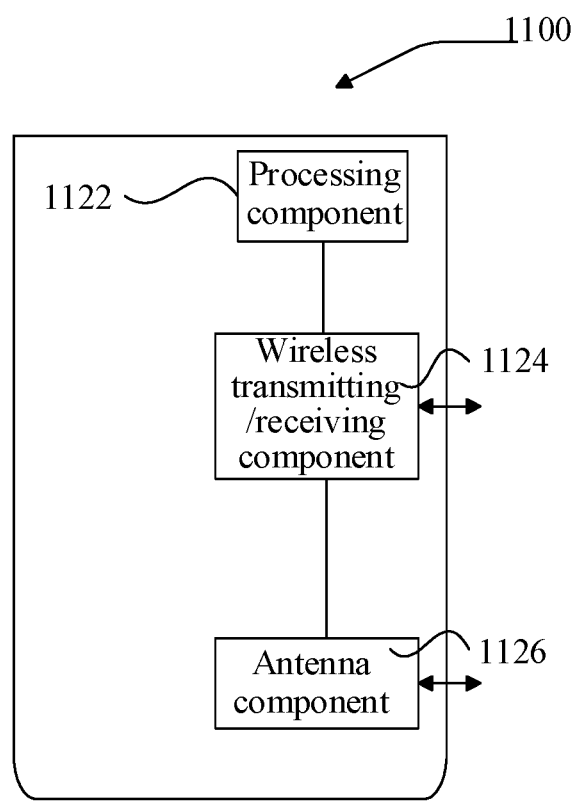
FIG. 11 is a block diagram of a device applied to HARQ feedback indication, according to an exemplary embodiment.

FIG. 11 is a block diagram of a device applied to HARQ feedback indication, according to an exemplary embodiment. The device 1100 may be provided as a base station. Referring to FIG. 11, the device 1100 includes a processing component 1122, a wireless transmitting/receiving component 1124, an antenna component 1126 and a wireless interface-specific signal processing part, and the processing component 1122 may further include one or more processors.

One processor of the processing component 1122 may be configured to:

determine present downlink data to be sent to UE;

generate uplink HARQ feedback indication information for the present downlink data, a timing relationship indicated by the uplink HARQ feedback indication information being included in a set of first timing relationships between time-domain units where downlink data for the UE are located and time-domain units for uplink HARQ feedback of the downlink data; and send the present downlink data and DCI carrying the uplink HARQ feedback indication information to the UE.

In an exemplary embodiment, there is also provided a non-transitory computer-readable storage medium including an instruction, and the instruction may be executed by the processing component 1122 of the device 1100 to implement the method for HARQ feedback indication. For example, the non-transitory computer-readable storage medium may be a Read-Only Memory (ROM), a Random-Access Memory (RAM), a Compact Disc Read-Only Memory (CD-ROM), a magnetic tape, a floppy disc, an optical data storage device and the like.

Figure 12:
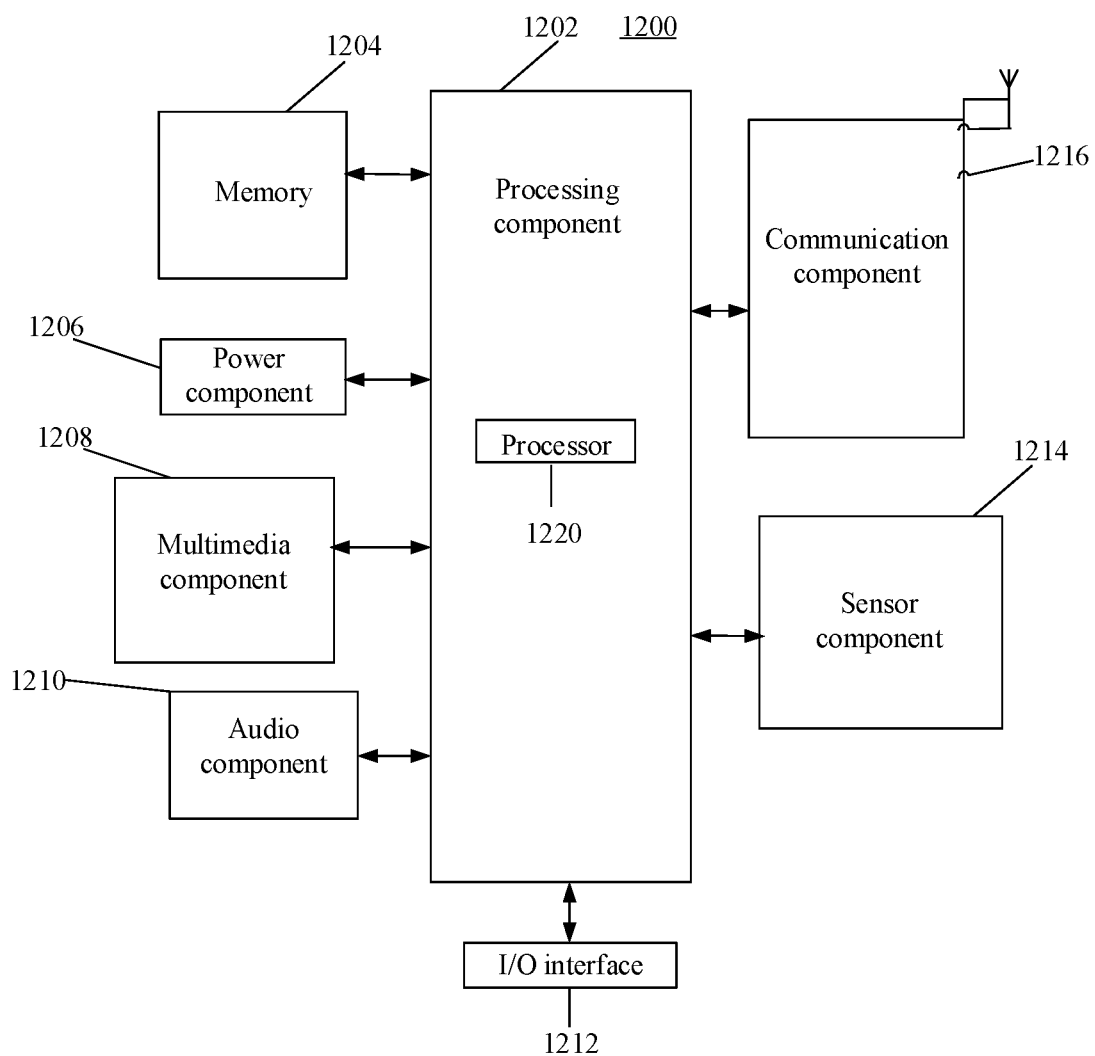
FIG. 12 is a block diagram of a device applied to HARQ feedback, according to an exemplary embodiment.

FIG. 12 is a block diagram of a device applied to HARQ feedback, according to an exemplary embodiment. For example, the device 1200 may be UE such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

One processor 1220 in the processing component 1202 may be configured to:

receive present downlink data and DCI carrying uplink HARQ feedback indication information for the present downlink data from a base station, a timing relationship indicated by the uplink HARQ feedback indication information being included in a set of first timing relationships between time-domain units where downlink data for a UE are located and time-domain units for uplink HARQ feedback of the downlink data;

obtain the uplink HARQ feedback indication information by parsing the DCI;

acquire a timing relationship between a time-domain unit where the present downlink data is located and a time-domain unit for uplink HARQ feedback of the present downlink data according to the uplink HARQ feedback indication information and the prestored set of first timing relationships; and send uplink HARQ feedback information for the present downlink data according to the acquired timing relationship.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a ROM, a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the HARQ feedback method.

In an exemplary embodiment, there is also provided a non-transitory computer-readable storage medium including an instruction, such as the memory 1204 including an instruction, and the instruction may be executed by the processor 1220 of the device 1200 to implement the above-mentioned method. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first," "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementations of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for Hybrid Automatic Repeat reQuest (HARQ) feedback indication, for applying to a base station and comprising:
   determining present downlink data to be sent to User Equipment (UE);
   generating uplink HARQ feedback indication information for the present downlink data, a timing relationship indicated by the uplink HARQ feedback indication information being comprised in a set of first timing relationships between time-domain units where downlink data for the UE are located and time-domain units for uplink HARQ feedback of the downlink data;
   sending the present downlink data and Downlink Control Information (DCI) carrying the uplink HARQ feedback indication information to the UE;
   predefining a set of second timing relationships between time-domain units where downlink data supported by a present system are located and the time-domain units for the uplink HARQ feedback of the downlink data, or notifying the set of second timing relationships to the UE through signaling;
   receiving capability information reported by the UE;
   in response to determining, according to the capability information, that the UE supports dynamic HARQ feedback, generating a generation configuration for the set of first timing relationships; and
   sending, to the UE, the generation configuration for generating, by the UE, the set of first timing relationships according to the generation configuration and the set of second timing relationships.

2. The method of claim 1, further comprising:
   receiving capability information reported by the UE;
   in response to determining, according to the capability information, that the UE supports dynamic HARQ feedback, generating the set of first timing relationships; and
   sending the set of first timing relationships to the UE.

3. The method of claim 1, wherein the uplink HARQ feedback indication information is carried in an information field of the DCI, and a bit length of the information field is a fixed value or is determined based on a number of timing relationships comprised in the set of first timing relationships.

4. The method of claim 1, wherein the signaling comprises Radio Resource Control (RRC) signaling, a Media Access Control (MAC) Control Element (CE) or physical-layer signaling.

5. The method of claim 1, wherein in response to the UE does not support dynamic HARQ feedback, the uplink HARQ feedback indication information is a fixed value, the fixed value is a plurality of fixed values in the set of first timing relationships and is preset by a present system or configured by the base station.

6. The method of claim 1, wherein the set of first timing relationships is a subset of the set of second timing relationships.

7. A communication system implementing the method of claim 1, comprising the base station and the UE, wherein the UE is configured to:
   obtain the uplink HARQ feedback indication information by parsing the received DCI;
   acquire the timing relationship between the time-domain unit where the present downlink data is located and the time-domain unit for uplink HARQ feedback of the present downlink data according to the uplink HARQ feedback indication information and a prestored set of first timing relationships; and
   send the uplink HARQ feedback information for the present downlink data according to the acquired timing relationship, to thereby achieve dynamic HARQ feedback;
   obtain a set of second timing relationships, which is predefined, or is received from the base station via signaling, between time-domain units where downlink data supported by a present system are located and time-domain units for uplink HARQ feedback of the downlink data;
   report capability information of the UE to the base station;
   receive a generation configuration, which is sent by the base station according to the capability information reported by the processor, for the set of first timing relationships;
   generate the set of first timing relationships according to the generation configuration received by the processor and the set of second timing relationships obtained by the processor; and
   store the set of first timing relationships generated by the processor.

8. A method for Hybrid Automatic Repeat reQuest (HARQ) feedback, for applying to User Equipment (UE) and comprising:
   receiving present downlink data and Downlink Control Information (DCI) carrying uplink HARQ feedback indication information for the present downlink data from a base station, a timing relationship indicated by the uplink HARQ feedback indication information being comprised in a set of first timing relationships between time-domain units where downlink data for the UE are located and time-domain units for uplink HARQ feedback of the downlink data;
   obtaining the uplink HARQ feedback indication information by parsing the DCI;
   acquiring a timing relationship between a time-domain unit where the present downlink data is located and a time-domain unit for a uplink HARQ feedback of the present downlink data according to the uplink HARQ feedback indication information and a prestored set of first timing relationships;

sending uplink HARQ feedback information for the present downlink data according to the acquired timing relationship;

obtaining a set of second timing relationships, which is predefined, or is received from the base station via signaling, between time-domain units where downlink data supported by a present system are located and the time-domain units for the uplink HARQ feedback of the downlink data;

reporting capability information of the UE to the base station;

receiving a generation configuration, which is sent by the base station according to the capability information, for the set of first timing relationships;

generating the set of first timing relationships according to the generation configuration and the set of second timing relationships; and storing the set of first timing relationships.

9. The method of claim 8, further comprising:

reporting capability information of the UE to the base station; and receiving and storing the set of first timing relationships which is sent by the base station according to the capability information.

10. The method of claim 8, wherein the uplink HARQ feedback indication information is carried in an information field of the DCI, and a bit length of the information field is a fixed value or is determined based on a number of timing relationships comprised in the set of first timing relationships.

11. The method of claim 8, wherein the signaling comprises Radio Resource Control (RRC) signaling, a Media Access Control (MAC) Control Element (CE) or physical-layer signaling.

12. The method of claim 8, wherein in response to the UE does not support dynamic HARQ feedback, the uplink HARQ feedback indication information is a fixed value, the fixed value is a plurality of fixed values in the set of first timing relationships, the fixed value is preset by a present system or configured by the base station.

13. A device for Hybrid Automatic Repeat reQuest (HARQ) feedback, for applying to User Equipment (UE) and comprising:

a processor; and a memory device configured to store processor-executable instructions, wherein the processor is configured to:

receive present downlink data and Downlink Control Information (DCI) carrying uplink HARQ feedback indication information for the present downlink data from a base station, a timing relationship indicated by the uplink HARQ feedback indication information being comprised in a set of first timing relationships between time-domain units where downlink data for the UE are located and time-domain units for uplink HARQ feedback of the downlink data;

obtain the uplink HARQ feedback indication information by parsing the DCI received by the processor;

acquire a timing relationship between a time-domain unit where the present downlink data is located and a time-domain unit for a uplink HARQ feedback of the present downlink data according to the uplink HARQ feedback indication information obtained by the processor and a prestored set of first timing relationships;

send uplink HARQ feedback information for the present downlink data according to the timing relationship acquired by the processor;

obtain a set of second timing relationships, which is predefined, or is received from the base station via signaling, between time-domain units where downlink data supported by a present system are located and time-domain units for uplink HARQ feedback of the downlink data;

report capability information of the UE to the base station; and receive a generation configuration, which is sent by the base station according to the capability information reported by the processor, for the set of first timing relationships;

generate the set of first timing relationships according to the generation configuration received by the processor and the set of second timing relationships obtained by the processor; and store the set of first timing relationships generated by the processor.

14. The device of claim 13, wherein the processor is further configured to:

report capability information of the UE to the base station; and receive and store the set of first timing relationships which is sent by the base station according to the capability information reported by the processor.

15. The device of claim 13, wherein the uplink HARQ feedback indication information is carried in an information field of the DCI, and a bit length of the information field is a fixed value or is determined based on a number of timing relationships comprised in the set of first timing relationships.

16. The device of claim 13, wherein the signaling comprises Radio Resource Control (RRC) signaling, a Media Access Control (MAC) Control Element (CE) or physical-layer signaling.

17. The device of claim 13, wherein in response to the UE does not support dynamic HARQ feedback, the uplink HARQ feedback indication information is a fixed value, the fixed value is a plurality of fixed values in the set of first timing relationships and is preset by a present system or configured by the base station.

* * * * *